(12) United States Patent
Swaffield et al.

(10) Patent No.: US 8,336,368 B2
(45) Date of Patent: Dec. 25, 2012

(54) METHOD AND EQUIPMENT FOR DETECTING SEALING DEFICIENCIES IN DRAINAGE AND VENT SYSTEMS FOR BUILDINGS

(75) Inventors: John Swaffield, Edinburgh (GB); David Campbell, Stoneyburn Bathgate (GB); Lynne Jack, Whitburn West Lothian (GB); Michael Gormley, Edinburgh (GB)

(73) Assignee: Heriot Watt University, Edinburgh (GB)

( * ) Notice: Subject to any disclaimer, the term of this patent is extended or adjusted under 35 U.S.C. 154(b) by 645 days.

(21) Appl. No.: 12/441,122

(22) PCT Filed: Sep. 12, 2007

(86) PCT No.: PCT/IB2007/003723
§ 371 (c)(1),
(2), (4) Date: Aug. 11, 2009

(87) PCT Pub. No.: WO2008/032224
PCT Pub. Date: Mar. 20, 2008

(65) Prior Publication Data
US 2010/0000298 A1 Jan. 7, 2010

(30) Foreign Application Priority Data
Sep. 15, 2006 (GB) .................... 0618206.7

(51) Int. Cl.
*G01M 3/28* (2006.01)

(52) U.S. Cl. .................... 73/40.5 R

(58) Field of Classification Search ............... 73/40.5 R; 340/605
See application file for complete search history.

(56) References Cited

U.S. PATENT DOCUMENTS

| 4,571,986 A | 2/1986 | Fujii et al. |
| 5,526,690 A | 6/1996 | Louie et al. |
| 5,708,195 A | 1/1998 | Kurisu et al. |
| 7,357,034 B1 * | 4/2008 | Worthington ............ 73/753 |
| 2004/0078878 A1 | 4/2004 | Gadtke et al. |
| 2006/0201088 A1 * | 9/2006 | Swaffield et al. ......... 52/302.1 |

FOREIGN PATENT DOCUMENTS

| EP | 0300647 A1 | 1/1989 |
| EP | 0133148 A2 | 2/2005 |
| JP | 60148022 | 8/1985 |
| JP | 61294326 | 12/1986 |
| JP | 1096677 | 4/1998 |

* cited by examiner

Primary Examiner — Daniel Larkin
Assistant Examiner — Tamiko Bellamy
(74) Attorney, Agent, or Firm — Hovey Williams LLP

(57) ABSTRACT

The method includes the following steps—introducing a low amplitude air pressure transient into the drainage and vent system of a building in order to propagate a pressure wave from a fitting (6) into a stack (1) and the network of the drainage system;—recording the passage of the transient by use of an air pressure transducer (7) located near the fitting (6) or introduction area of the transient;—establishing a pressure versus time signature recorded by the pressure transducer (7) and sending those signals to a central data acquisition system;—the pressure transient is propagated throughout the network at an acoustic velocity and is reflected by each and every pipe termination of the network so as to establish a characteristic reflection coefficient for each pipe termination;—the characteristic reflection coefficient is compared with testing results performed initially in a perfect network with no dry trap defects or leakages and in case a different signature is of the pressure trace is recorded, the point of diversion will be determined at the time at which the reflection from the altered pipe end termination arrives at the air pressure transducer so that the comparison of this direct trace with the stored defect free signature yields that time and, as the wave speed is known, the determination of the distance from the pressure transducer to the defective trap or seal.

13 Claims, 7 Drawing Sheets

METHOD AND EQUIPMENT FOR DETECTING SEALING DEFICIENCIES IN DRAINAGE AND VENT SYSTEMS FOR BUILDINGS

CROSS-REFERENCE TO RELATED APPLICATIONS

This is a national stage application of International Application PCT/IB2007/03723 filed Sep. 12, 2007 which claims priority to and the benefit of UK Application Serial No. 0618206.7 filed Sep. 15, 2006, the entire disclosures of which are expressly incorporated herein by reference.

BACKGROUND OF THE INVENTION

1. Field of the Invention

The present invention relates to a method and equipment for detecting sealing deficiencies, such as defective water traps and other sealing failures, within the drainage and vent systems for buildings.

2. Description of the Related Art

The purpose of a drainage system installed in a building is for conducting wastewater from sanitary appliances such as toilets, wash basins, bathtubs, etc into the sewer usually located in the underground of the building. In case of a multi-storey building, the drainage system has at least one vertical stack extending through the floor of each store and branch pipes for conducting the wastewater from each of the sanitary appliances present on each floor into the vertical stack by means of connectors. The stack and/or branch pipes or even each individual sanitary appliance may have been provided with air admittance valves or other appropriate venting arrangements and/or positive air pressure attenuator devices.

Water traps or water seals are generally used in relation with most sanitary equipment. Their purpose is to avoid fouled air coming from the sewer to be released into the environmental space or habitable space. The water trap is usually consisting of a U-shaped or bottle-shaped housings, generally connected to each of the sanitary appliances, and in which a certain amount of water remains in place sealing off the air from the stack and the sewer. Water closets have a water trap built into the fixture itself.

Under certain conditions, such as negative or positive air pressure conditions, the water traps could become disrupted which means that no sufficient amount of water remains in place to assure the sealing off from the discharge pipes and allowing fouled air from the sewer to enter into the habitable space. Such failures may result in pathogen transmission paths or system failure due to overpressure resulting in fouling the living space.

Venting of the drainage system is therefore important in order to prevent air pressure differentials in the system and in most of the systems use is of air admittance valves (AAV).

An air admittance valve (AAV) allows air to enter the drainage system through a one-way air valve when a sanitary fixture is operated and water flows through the pipes. When a column of waste water falls through the vertical stack, it entrains an airflow whose presence of necessity generates local suction or negative pressures. These are transmitted through the network and may lead to siphonnage of appliance water trap seals. In order to compensate for these negative pressures the membrane of the AAV is lifted temporarily and allows ambient air to enter the drainage system. The extent of these pressure fluctuations is determined by the fluid volume of the waste discharge. Excessive negative air pressure can siphon water from the water seals in the traps of sanitary appliances if no AAV are present.

On the other hand, if the air pressure within the drain becomes suddenly higher than ambient, this positive transient could cause wastewater (and air) to be pushed into the appliance, breaking the trap seal, with dire hygiene and health consequences. Positive air pressure attenuator devices have therefore been developed and proposed to reduce such risks of contamination, especially in high or multi-storey buildings.

SUMMARY OF THE INVENTION

The problem to be solved by the present invention is to locate or identify any possible deficiency in the drainage and vent system of a building and in particular the position of defective water traps, normally defined as traps having lost their water seal, or other defects in the building drainage systems, such as leaking junctions or fittings or defects resulting from blockage to the free passage of water and entrained air.

The purpose of the present invention is to propose a method and appropriate equipment to detect and identify such failures within a building drainage and vent system by virtue of their transient reflection coefficients. Indeed, such failures or defects present a changed reflection coefficient to any incoming low amplitude air pressure transient when compared to the response applied to an accurate system layout.

Indeed, if there exists both a "defect free" database of system response to an applied transient and an accurate system layout, then the location of any defect may be identified as the speed of propagation of any transient will be constant at the airborne acoustic velocity, thus yielding a time differential between reflected waves fronts detected at monitoring locations.

According to the present invention the equipment consist in a transient generator connected to a portion of a vertical stack and a series of low pressure transducers also connected to the stack and capable of detecting and transmitting cycling positive/negative low air pressure wave reflections into electrical signals to be sent to a network database. Said method and equipment for detecting deficiencies, such as leaks, in a drainage and vent system for buildings are configured and provided with means as set forward in the appended claims.

BRIEF DESCRIPTION OF THE DRAWINGS

An embodiment of an installation provided with the equipment according to the invention will be described hereafter, by way of an example only, with reference to the accompanying drawings, in which.

DETAILED DESCRIPTION OF THE INVENTION

Figure 1:
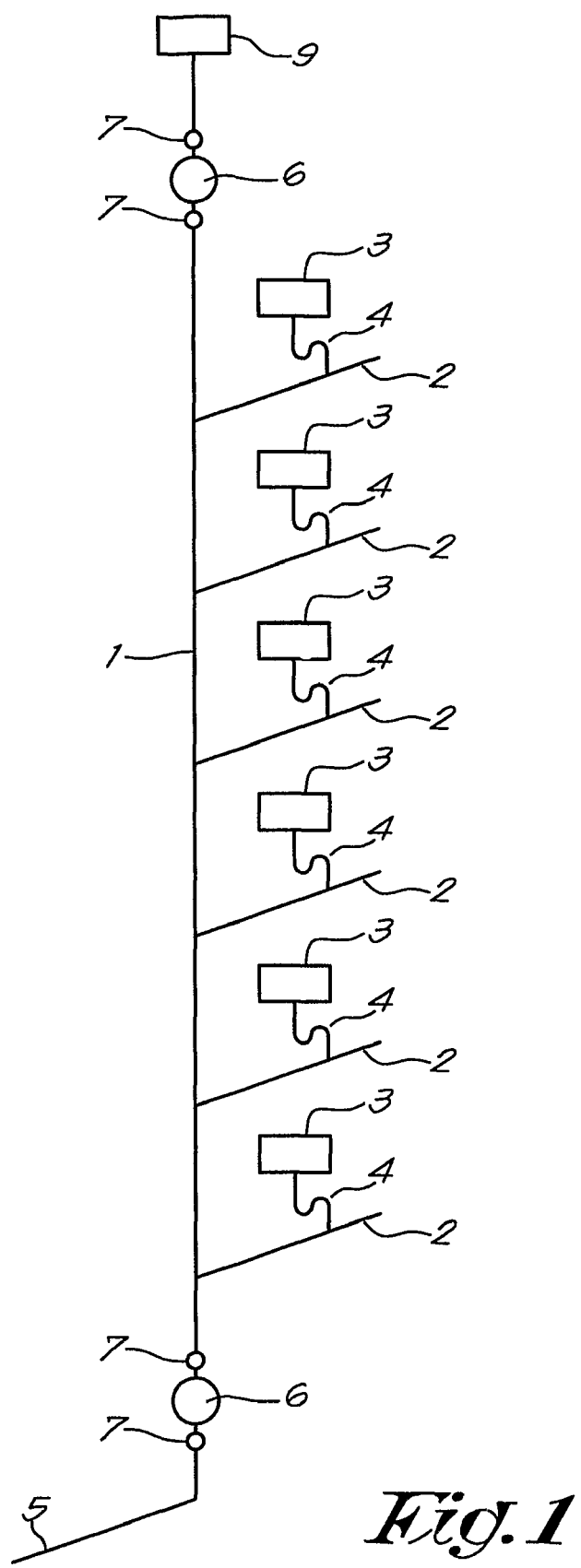
FIG. 1 is a schematic representation of a simple stack drainage system in a multi-storey building.

As shown in FIG. 1 a drainage system of a multi-storey building is represented in a simplified manner and comprises a vertical stack discharge pipe 1 to which are connected a series of drain pipes 2 coming from each floor and in which discharge sources 3 from the respective floors may be drained. Said discharge source may be any sanitary appliance such as water closets, floor drains, sinks, showers, bidets or the like.

Between each discharge source 3 and the drainpipes 2, the plumbing generally includes U-shaped water traps 4 or the like.

The liquid and/or liquid/solid discharges from the discharge sources 3 are delivered through their respective traps 4 into the drainpipes 2 and subsequently through the vertical stack pipe 1 to be finally delivered to the sewer 5.

The complete system is vented to the surrounding atmosphere by means of air admittance valves 9 generally provided at the upper extremity of the stack pipe 1 but may also be incorporated in the housing of the water seals. As already explained, the drainage system should preferably also be equipped with positive air pressure attenuator devices (not shown).

Figure 4:
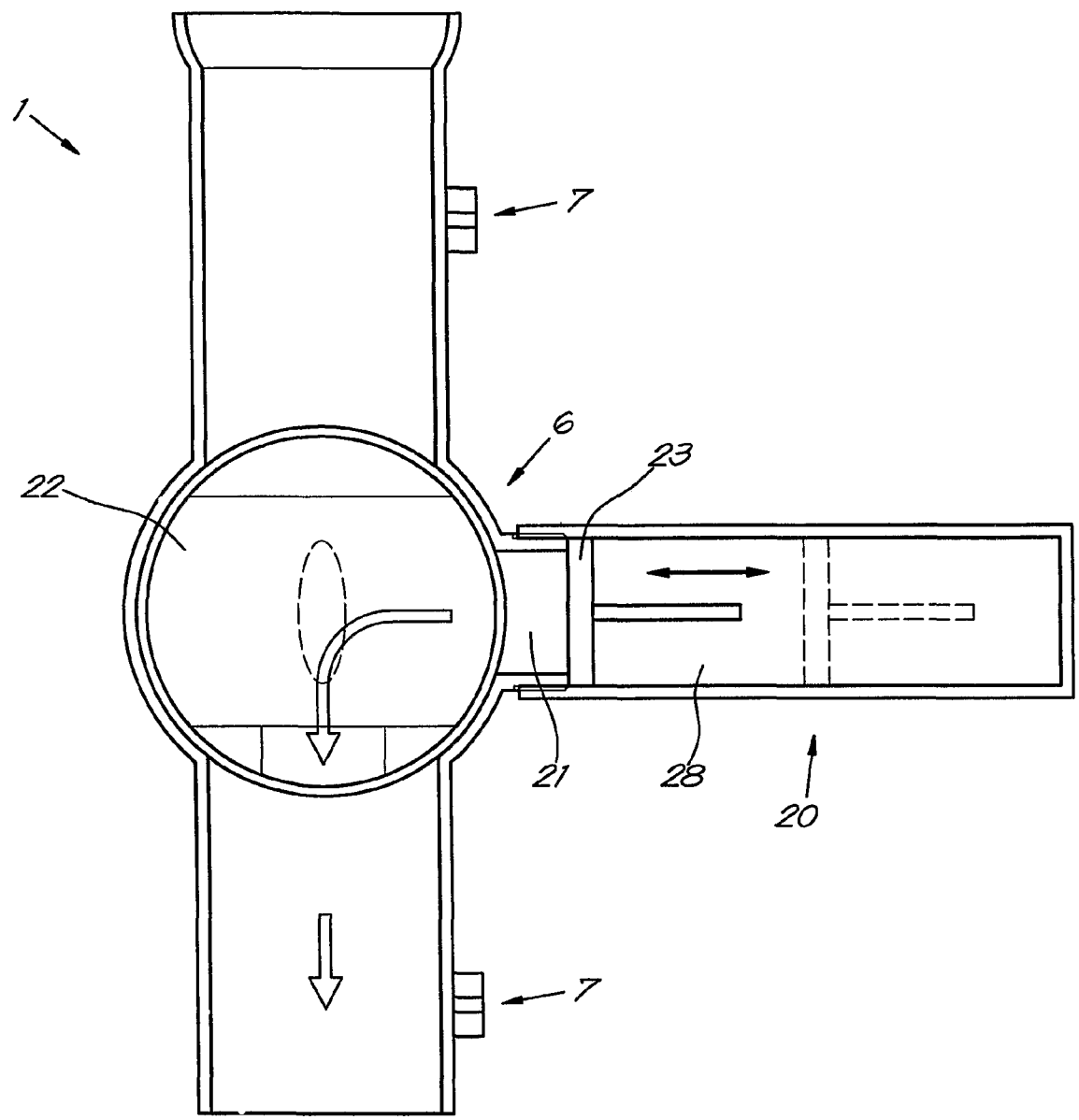
FIG. 4 is an identical view as FIG. 3 with the transient generator connected to the fitting.
Figure 6:
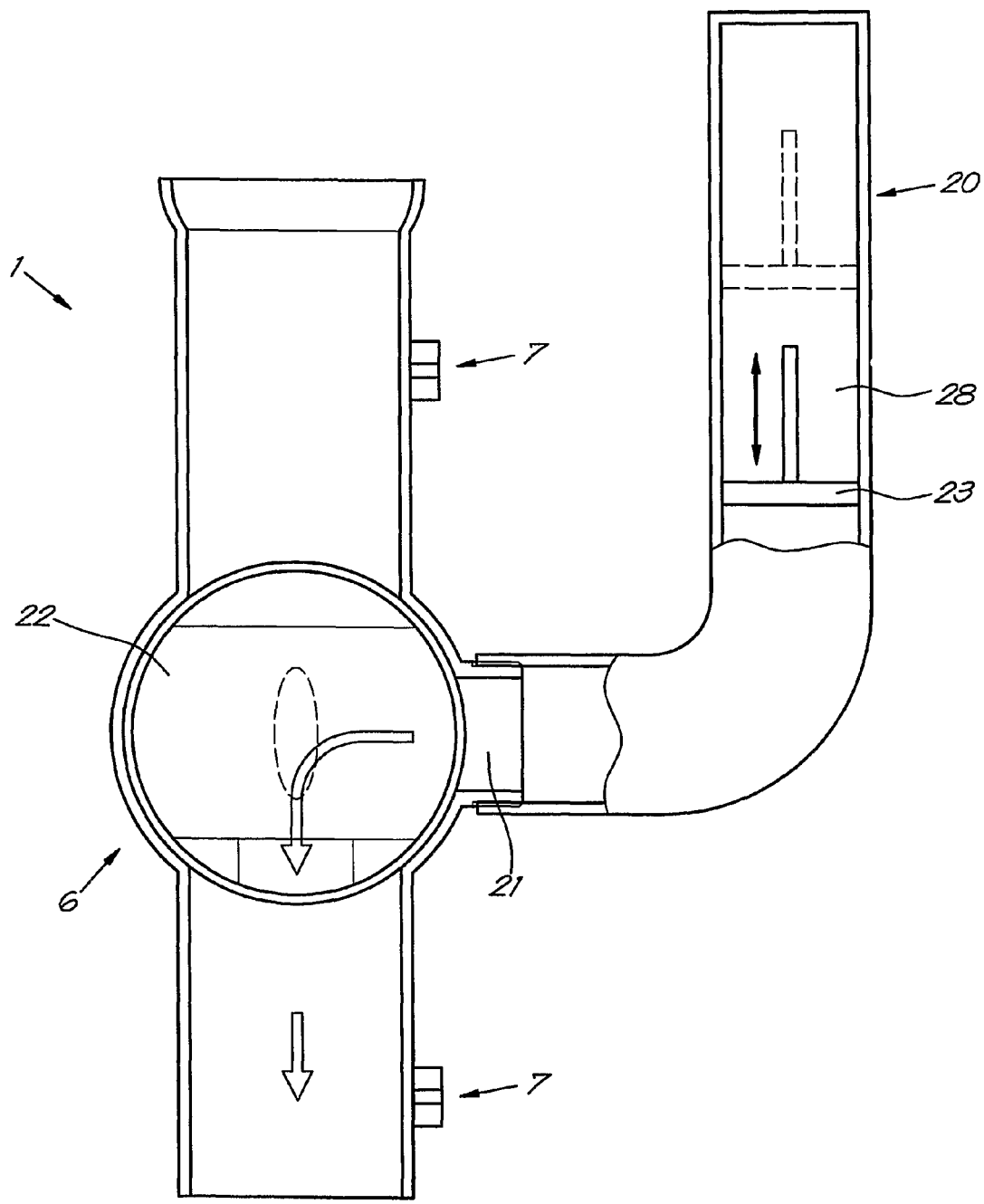
FIGS. 6 and 7 are alternate embodiments of the transient generator.
Figure 7:
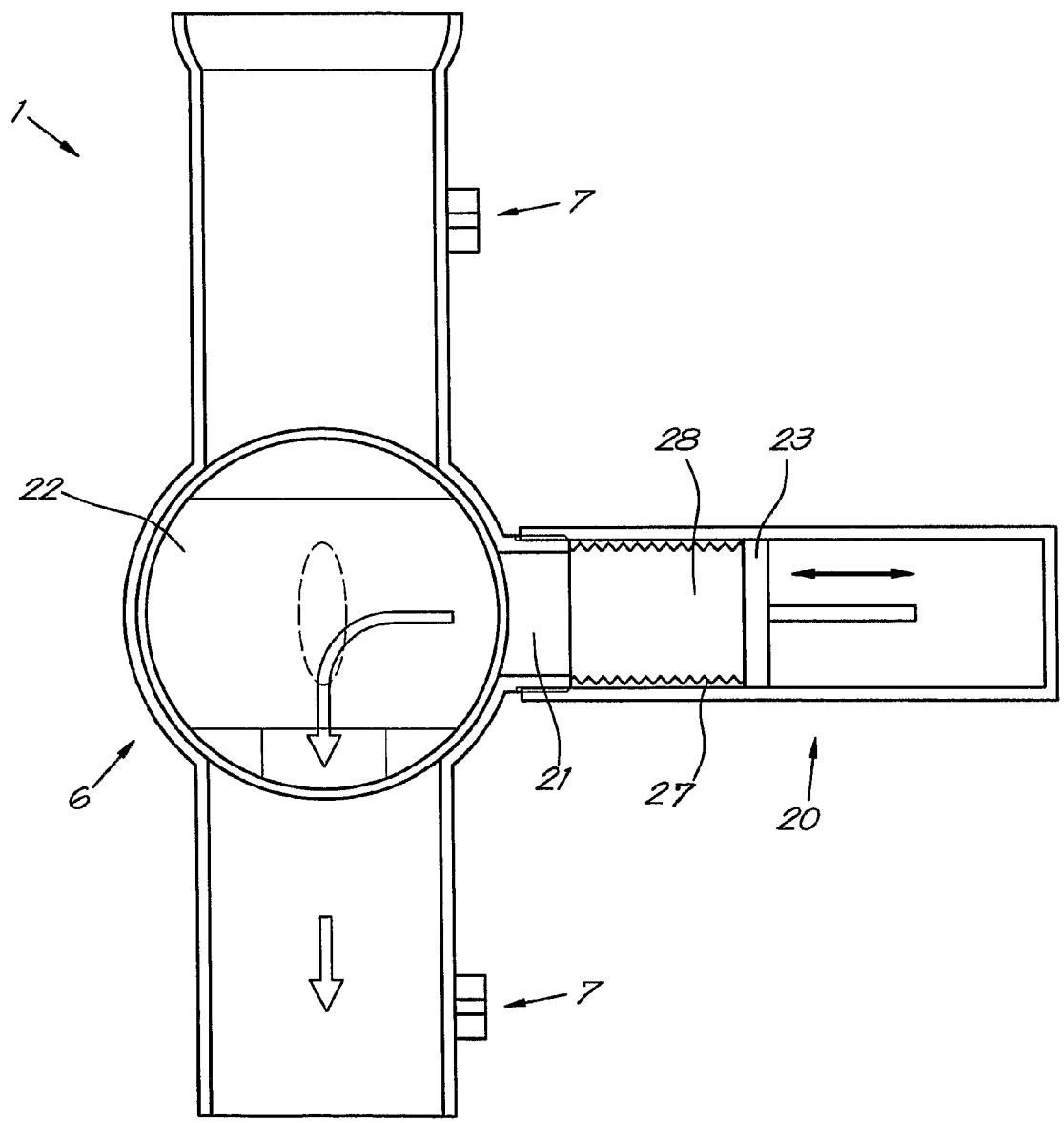

According to the present invention, the vertical stack 1 is provided, at appropriate locations, with at least one fitting 6, representing a mechanical device designed to be inserted in-line with the drainage stack 1. The fitting 6 is provided with a connection 21 between the interior space of the stack 1 with the output section of an transient generator 20 as represented in FIGS. 4, 6 and 7 and will be described later. At proximity of each fitting 6, the stack 1 is also provided with low pressure transducers 7 which are capable of recording the air pressure variations such as transient response of the drainage network and are connected to a central data acquisition system integrated into a building.

Figure 2:
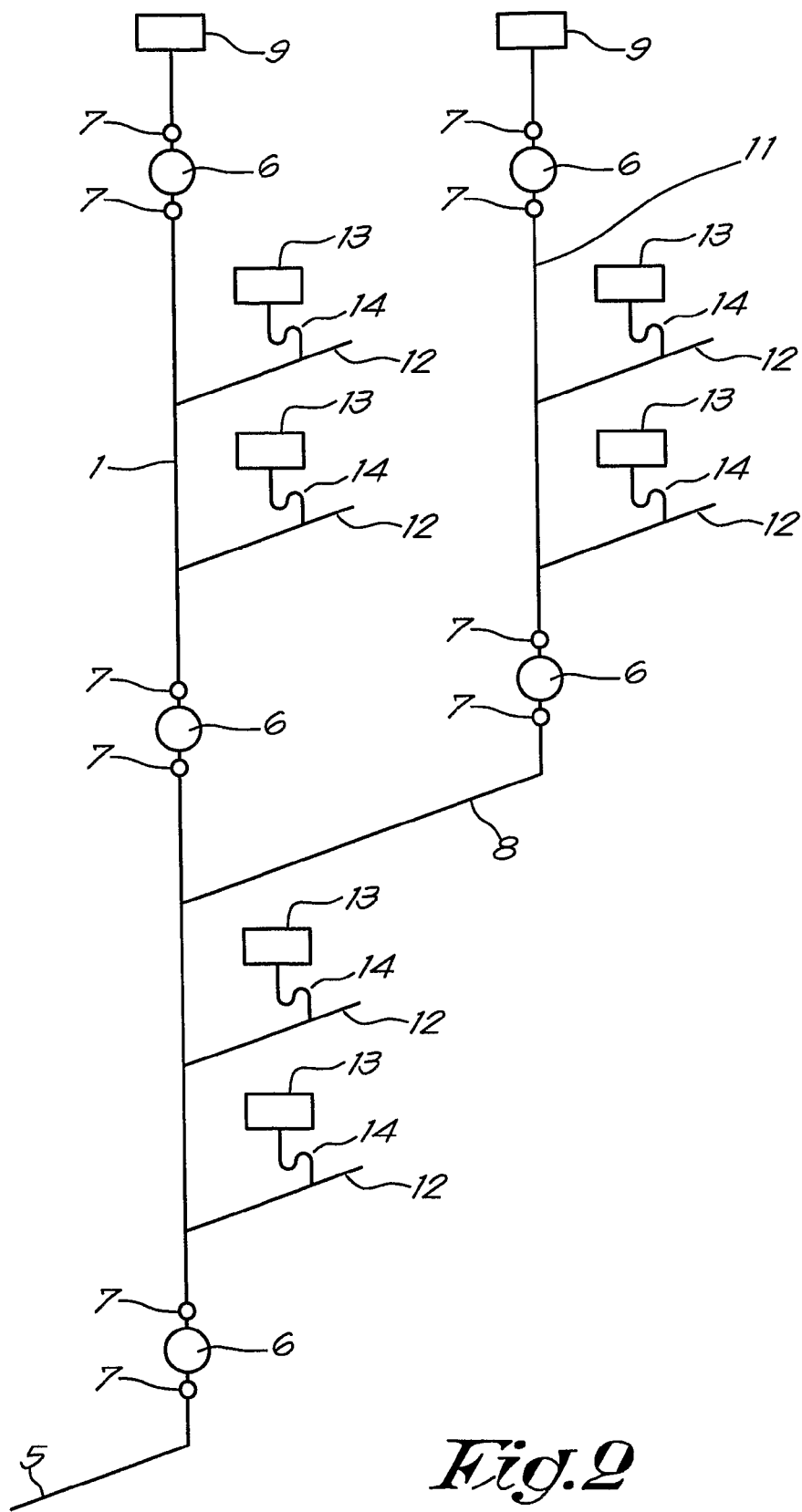
FIG. 2 is a schematic representation of a double stack drainage system in a multi-storey building.

The FIG. 2 represents a more complex drainage system with a main stack pipe 1 and a secondary stack pipe 11. Similar drain pipes 12 discharge waste water/solids from the discharge sources 13 into the stack pipes 1 and 11. The secondary stack pipe 11 is connected to the main stack pipe 1 by means of a connection pipe 8.

At appropriate locations, similar fittings 6, for connecting the transient low air pressure generator 20, and low pressure transducers 7 are installed.

The transient low air pressure generator 20 is generally a mechanical device consisting of a moveable surface sealed against an outer container or cylinder, for example a piston 23 or bellows, whose moveable surface is operated by means of an electromechanical device capable of a controlled, reciprocating action.

As represented in FIG. 4, the generator 20 is attached to the stack 1 by means of a fitting 6, which is provided with a threaded connection 21 to the generator 20. The generator 20 as a generally cylindrical body containing an inner chamber 28 and a piston 23 capable of moving the air contained in the chamber 28 with an adequate velocity and/or frequency into the interior space of the stack section 1.

Figure 5:
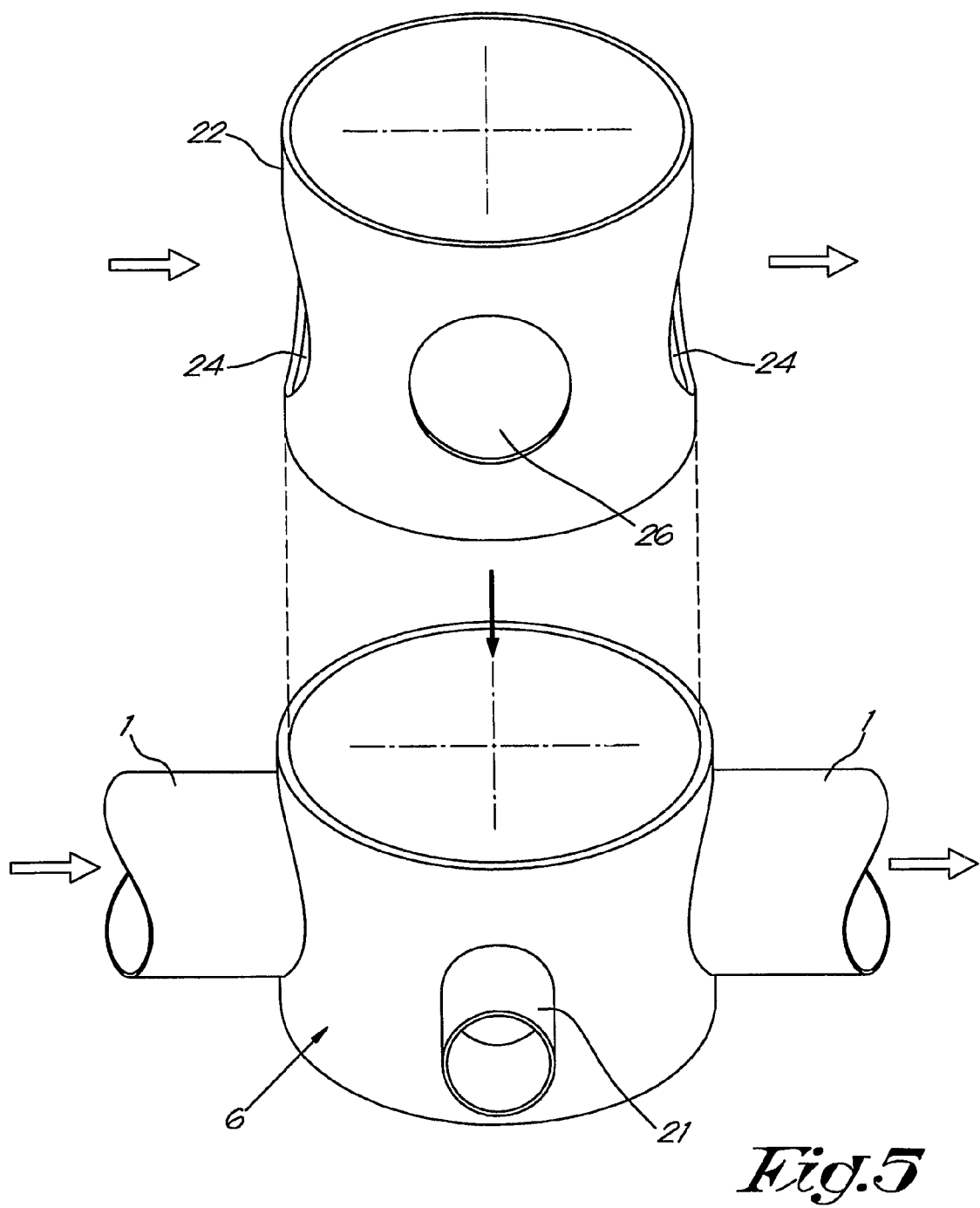
FIG. 5 is an exploded view of a fitting provided with a three port rotatable valve.

The fitting 6 is represented on the FIGS. 3, 4, 6, 7 and more in detail on FIG. 5 and is consisting in a mechanical device designated to be inserted in-line with the drainage stack 1 and to provide a connection means 21 to the output of the generator 20.

As shown on FIG. 5, such a fitting mechanism is realised as a three-port valve 22 capable of rotation within the fitting 6. The valve 22 is provided with two diametrically opposed apertures 24 corresponding with the diameter of the vertical stack 1 and with one lateral opening 26 located at the position of the connection means 21 with the generator 20.

Figure 3:
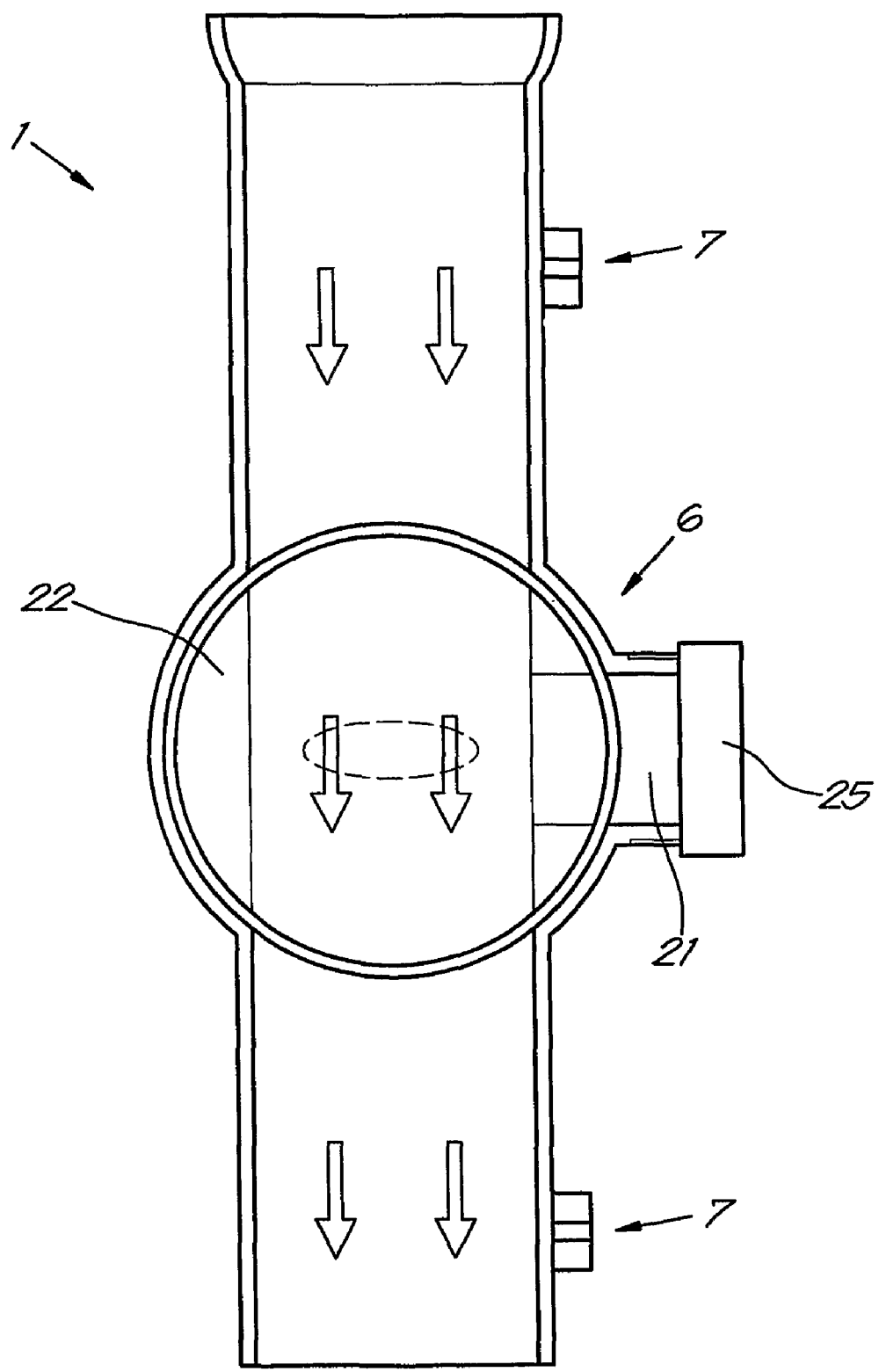
FIG. 3 is a detailed view of a stack portion provided with a build-in fitting capable of receiving a transient generator.

Rotation of the valve 22 is accomplished with any external mechanical or electromechanical actuator, which does work against a mechanical containing mechanism, for example springs or weights, which return the valve 22 to the failsafe condition represented in FIGS. 3 and 5, in the event of a power failure. The travel provided by the actuator 20 limits the rotation of the valve 22 and prevents rotation greater than about 90°.

The fitting 6 is capable of directing the output of the generator 20 either upwards or downwards into the drainage stack 1. Upon completion of the testing or detection process, the fitting 6 must return to a failsafe condition of uninterrupted vertical transport in the drainage stack 1.

The valve 22 provides two "closed" configurations, the first one when the valve is rotated anti-clockwise (arrow A in FIG. 5), which situation is represented in FIG. 4 and which is closing off the upper side of the stack 1, and the second one when the valve 22 is rotated clockwise (arrow B, not represented) closing off the lower side of the stack.

In case no generator 20 is installed or when the detection process is completed, a locking plug 25 (FIG. 3) is used and adapted to the connection means 21 of the generator 20 providing the locking of the valve 22 into a failsafe configuration when inserted. By means of appropriate thread diameters at the plug 25/valve 22 connection means 21, the locking plug 25 can only be inserted when the valve 22 is in a failsafe configuration which means that the apertures 24 are in-line with the inner diameter of the stack 1.

The overall dimensions of the three port fitting 6 will be similar to current stack dimensions. It will be cylindrical in section with a full passing-through diameter corresponding to the stack diameter. In case a stack was considered with diameter 150 mm, then the most likely overall dimension of the fitting would be in the range of 225 to 250 mm. The device could be sleeved to allow use with smaller diameter stacks which would have the advantage that only one size device need to be produced and marketed together with the inset sleeves.

The FIGS. 6 and 7 represent alternative embodiments of the generator 20. According to the FIG. 6 the connection means 21 is in the shape of a 90° elbow and the generator 20 is positioned parallel to the stack 1 in order to save space if needed. The FIG. 7 shows an embodiment of generator 20 in which the piston 23 is part of a pleated cylindrical membrane 27 containing the chamber 28 in which the air transient is generated and directed through the connection means 21 and the three port valve 22 of the fitting 6 towards the lower part of the stack 1, passing nearby the pressure transducer 7.

The identification of drainage network defects, through the use of positive or negative air pressure transients, requires thus additional equipment to that normally found in a building drainage and vent system. The introduction of the transient will require mainly two additional components:

a dedicated system junction, such as the fittings 6 and a transient low air pressure generator 20.

Both components may be incorporated into a single device, or may exist as separate devices. If they were incorporated into a single device, then the device(s) would be installed in fixed location(s) within the drainage network. If they exist as separate devices, then the system junctions or fittings 6 would be installed in fixed locations and the transient generator(s) would be moved from one location to an other within a complex network to facilitate testing.

In any case, the pressure transient generator 20 will be capable of introducing a positive, negative or cycling positive/negative pressure wave by either the action of a piston, fan, bellows, membrane or other moving surface within the device that allows system/air interaction, or a connection to a stored pressure source. The generation of the air transient will, in any case, be repeatable and/or produced by a sine wave oscillation.

The design of the permanent fittings 6 and the generator 20 will ensure that no cross contamination or leakage of the drainage system gas into the habitable space can occur during connection, operation or disconnection of the equipment. The design of a stored pressure source, if used, will exclude the possibility of backflow into the vessel when exhausted.

The method for defect identification thus includes the following processes and equipment:

- A detailed system layout is required, drawn from building design or a specific survey;
- A means of introducing a low amplitude air pressure transient into the building drainage and vent system will be utilised to propagate a pressure wave into the network. The response of the defect free system to this transient will be recorded by a number of pressure transducers 7 strategically located at various nodes around the network. This response will define the system and will be used as a base against which to compare responses from the same network following use and the appearance of defects. The defect free database will be stored for future reference as part of the identification methodology.
- A transient generator 20 will be capable of propagating a pressure transient of less than trap seal depth into the network; this limit will ensure that the testing is not damaging to the integrity of the network's trap seals. This pressure transient generator 20 will be based on the ability to generate into, or connect to, the system, to give a timed pressure pulse. It will require a dedicated system junction 6 and will be wholly sealed so that no cross contamination may occur as a result of the transient application. Under normal use, the transient identification of dry trap seals and other defects will be activated at regular intervals during quiescent system operation periods or as a result of operative concern as to the integrity of the network, possibly triggered by user dissatisfaction;
- The pressure response to the applied transient will be compared to the database of stored system response and the divergence of pressure response results, as recorded by the network of pressure transducers 7, will be used to identify the location of the defect seal.

More practical information about the method according to the invention is given hereafter.

The rotation of the three port valve 22 inside the fitting 6 in either clockwise or anticlockwise direction, provides in each case an air-path from the internal chamber 28 of the generator 20 through the three port valve 22 into the drainage network situated respectively above or below the fitting 6.

Rapid movement of the piston 23 or volume change within the chamber 28 of the generator 20 generates a pressure transient that propagates from the generator 20 throughout the selected drainage network. Its passage is recorded by the pressure transducer 7 located adjacent to or part of the fitting 6.

The pressure transient propagates throughout the network at the acoustic velocity in air of approx. 320 m/s. It is reflected at each and every pipe termination. These reflections in turn propagate back to the source of the transient at the generator 20 and contribute to a pressure versus time signature recorded at the location of the fitting 6 by the pressure transducer 7.

Each pipe termination has a characteristic reflection coefficient. For example a dead end has a +1 reflection coefficient while an open end to atmosphere has a −1 reflection coefficient. Partial blockages or leaking terminations have reflection coefficients that lie between these limits.

If the generator 20 is operated in a perfect network with no dry trap defects or leakage's, then the pressure transducer 7 records a baseline defect free signature over a time period which is short and determined by the overall length of the network and the acoustic velocity. This is likely to be a small number of seconds at maximum.

If the system develops a defect, such as a trap dried out, then the pressure transducer 7 will record a different signature pressure trace. The point of diversion will be at the time at which the reflection from the altered pipe end termination arrives at the transducer. Comparison of this defect trace with the stored defect free signature yields that time and hence as the wave speed is known the distance to the defective trap is identified. Reference to the drainage network layout then identifies the location of the defect.

An additional test for defect location would be to generate during building commissioning a comprehensive set of signature traces for both defect free and controlled defect locations on each floor. Numerical comparison of a subsequent defective system signature against this dataset would also identify the location of the defective trap.

In addition to identifying dry traps, it now appears that it is also possible to identify partially closed pipe terminations which could have implications for the identification of defective AAV's if such exists.

According to the present invention, the network under test itself acts as the conduit for the transmission of the test transient so that no other network piping or fittings are required. The equipment consists mainly of the following elements:

- a transient generator 20 that will utilise a fluid/structure interaction to generate a transient;
- a three port rotatable valve 22, within the fitting 6, that will allow the transient generated by the generator 20 to travel in either direction in the drainage system vertical stack 1;
- a three port casing and stack connector or fitting 6 that will be compatible with existing stack components, and
- low pressure transducers 7 located adjacent to the connector 6 and connected to a central data acquisition system that will be whenever possible integrated into the building.

In case the air transient generator 20 is provided with a piston 23 being moved following a sine wave oscillation instead of a pulse, it should be possible to provide an equipment which is non-invasive, which means that it is no more compulsory to isolate or close-off a section of the drainage stack in order to realise the faulty trap detection.

The description and the drawings of the present application are merely an example of how the method and the equipment could be worked out but any other equivalent means are possible without departing from the features set forward in the appended claims.

The invention claimed is:

1. Method for detecting sealing deficiencies within a drainage and vent system for buildings wherein the drainage and vent system comprises a network of pipes and at least one main vertical stack to which are connected a series of drain pipes coming from each floor for draining a discharge outlet of sanitary appliances, the discharge outlet being generally provided with water traps and the drainage and vent system being eventually provided with air admittance valves or other appropriate venting arrangements and positive air pressure attenuator devices, the method comprising the steps of:

introducing, at an introduction area, a low amplitude air pressure transient generated by an air transient generator into the drainage and vent system of a building;

transmitting said transient generated by the air transient generator through a fitting inserted in-line with the stack, wherein the fitting including a connection means for fluidically connecting an output of the air transient generator to an interior space of the stack in order to propagate a pressure wave into the network of the drainage system, the fitting including a diverter valve having at least one aperture having a lateral opening located at a position of the connection means for connecting the fitting with the air transient generator;

recording the passage of said transient by means of an air pressure transducer located near the introduction area of the transient;

recording successive pressure reflections of the transient from each of a plurality of drain pipes of the network of the drainage and vent system; and establishing a pressure versus time signature recorded by the pressure transducer and sending signals corresponding to the pressure versus time signature to a central data acquisition system.

2. Method according to claim 1, wherein the introduction of the low amplitude pressure transient is generated to propagate throughout the network at an acoustic velocity and its reflection by a plurality of pipe terminations of the network is recorded and transmitted to the central data acquisition system so as to establish a characteristic reflection coefficient for each pipe termination of said plurality of pipe terminations.

3. Method according to claim 1, wherein the method is performed initially in a network with substantially no dry trap defects or leakage's so that the pressure transducers record a baseline defect free signature over a given period of time which is determined by the overall length of the network and the acoustic velocity of the air pressure transient into the drainage and vent system.

4. Method according to claim 3, wherein during a subsequent testing operation, the baseline defect free signature is compared with the actual situation and in case a different signature of the pressure trace is recorded, a point of diversion will be determined at the time at which a reflection from an altered pipe end termination arrives at the air pressure transducer so that the comparison of this defect trace with the stored defect free signature yields that time and, as the wave speed is known, the determination of the distance from the pressure transducer to the defective trap or seal.

5. Equipment for use in detecting sealing deficiencies within a drainage and vent system of a building having at least one vertical discharge pipe or stack to which are connected a network of drain pipes coming from each floor and in which sanitary appliances or discharge sources may be drained, said equipment comprising:

at least one air transient generator connected to the stack;

at least one pressure transducer, located adjacent to the generator, said transducer being capable of recording a transient response from the drainage network and recording pressure reflections from the piping system generated by the at least one air pressure transient generator, and a central data acquisition system operatively connected to the at least one pressure transducer for receiving signals from the at least one pressure transducer corresponding to a pressure versus time signature generated by the at least one pressure transducer and for establishing a characteristic reflection coefficient for a plurality of pipe terminations in the drainage and vent system, wherein the air transient generator is connected to the stack by means of a fitting inserted in-line with the stack, said fitting including a connection means for providing a fluidic connection between the output of the generator and an interior space of the stack, and wherein the fitting comprises a diverter valve having at least one aperture having a lateral opening located at the position of the connection means for connecting the fitting with the air transient generator.

6. Equipment according to claim 5, wherein the diverter valve comprises a three-port valve with two diametrically opposed apertures, one of said apertures corresponding to an interior diameter of the vertical stack, and the other of said apertures being said aperture having the lateral opening located at the position of the connection means for connecting the fitting with the air transient generator.

7. Equipment according to claim 5, wherein the diverter valve provides a path from the internal chamber of the generator through the stack and diverter valve into the interior space of the stack and the drainage network situated respectively above or below the fitting.

8. Equipment according to claim 5, wherein the pressure transducer is a low air pressure transducer capable of recording an air transient passage in the stack and a subsequent reflection received from each drain pipe of the drainage network and to transmit such information by means of electrical signals to a central data acquisition system.

9. Equipment according to claim 5, wherein the fitting is provided with means securing the return of the diverter valve to a failsafe position upon completion of a testing or detection process whereby the aperture is in fluidic communication with the interior diameter of the stack automatically after completion of the detecting process.

10. Equipment according to claim 9, wherein the connection means of the fitting is closed off with a locking plug when the transient generator is removed, said locking plug ensuring the failsafe position of the diverter valve.

11. Equipment according to claim 5, wherein the air transient generator comprises a cylindrical body with an inner chamber, whereby air within the inner chamber can be displaced by means of a piston generating the air transient to be directed through the connection means towards the interior space of the stack and a selected section of said network.

12. Equipment according to claim 11, wherein the piston generating the air transient is moved according to a sine wave oscillation.

13. Method according to claim 1, wherein the diverter valve comprises a three-port valve with two diametrically opposed apertures, one of the apertures corresponding to an interior diameter of the stack and the other of said apertures being said aperture having the lateral opening located at a position of the connection means for connecting the fitting with the air transient generator whereby said transient can be selectively transmitted through either said one or said other aperture.

* * * * *